(No Model.)  2 Sheets—Sheet 1.

F. SERVUS.
PLATE HOLDER.

No. 473,359.  Patented Apr. 19, 1892.

Witnesses,
Robt Garrett
J. A. Rutherford

Inventor,
Ferdinand Servus.
By James L. Norris.
Atty.

THE NORRIS PETERS CO., PHOTO-LITHO., WASHINGTON, D. C.

(No Model.) 2 Sheets—Sheet 2.

F. SERVUS.
PLATE HOLDER.

No. 473,359. Patented Apr. 19, 1892.

Witnesses.
Robert Pratt.
J. A. Rutherford.

Inventor.
Ferdinand Servus.
By
James L. Norris.
Atty.

UNITED STATES PATENT OFFICE.

FERDINAND SERVUS, OF BERLIN, GERMANY.

PLATE-HOLDER.

SPECIFICATION forming part of Letters Patent No. 473,359, dated April 19, 1892.

Application filed October 30, 1891. Serial No. 410,400. (No model.)

*To all whom it may concern:*

Be it known that I, FERDINAND SERVUS, a subject of the King of Prussia, and a resident of Berlin, Germany, have invented certain new and useful Improvements in Plate-Holders, of which the following is a specification, reference being had to the accompanying drawings.

This invention has for its object to provide a simple, economical, and efficient plate-holder for a photographic camera which will effectually exclude the light from the plate or film contained therein.

To accomplish this object my invention involves the features of construction and the combination or arrangement of devices hereinafter described and claimed, reference being made to the accompanying drawings, in which—

Figure 1:
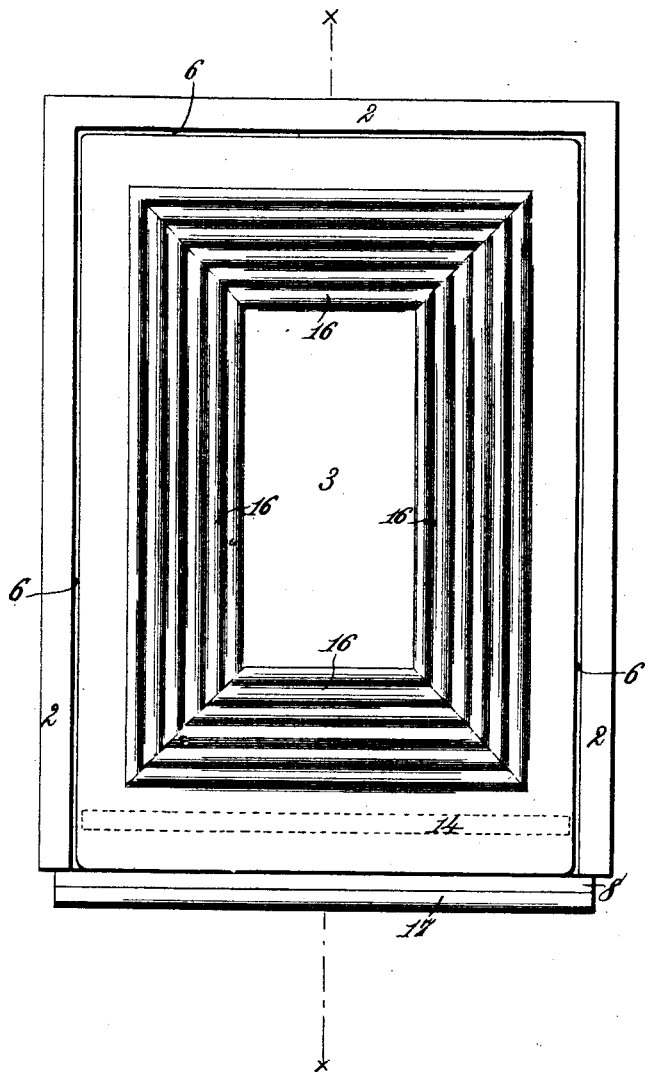
Figure 2:
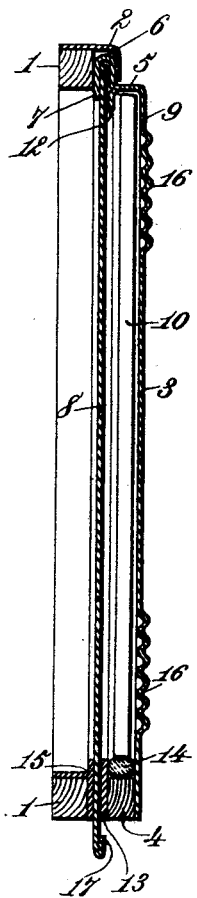
Figure 3:
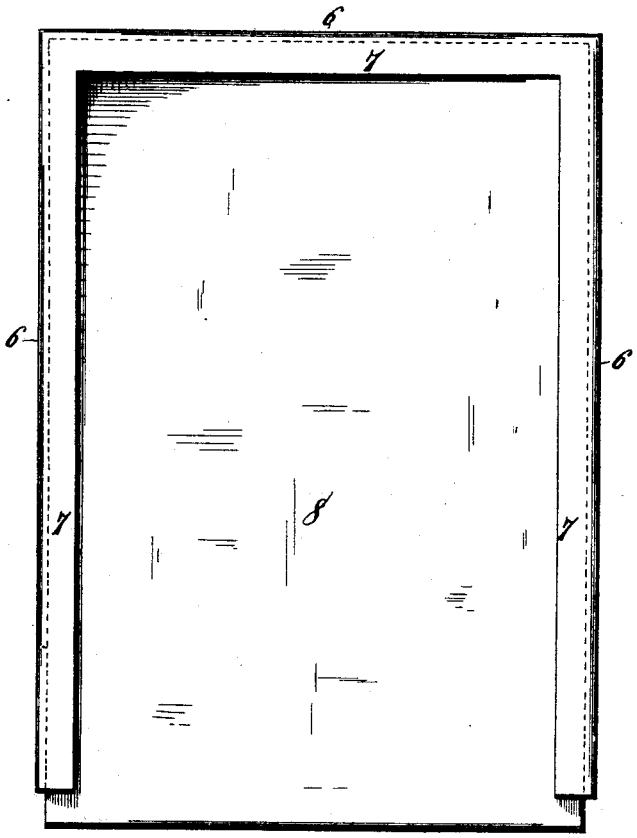

Figure 1 is a rear side elevation showing the plate-holder applied to a portion of the frame of a camera. Fig. 2 is a longitudinal sectional view taken on the line $x$ $x$, Fig. 1; and Fig. 3 is a front side elevation of the plate-holder removed from the frame of the camera.

In order to enable those skilled in the art to make and use my invention, I will now describe the same in detail, referring to the drawings, wherein—

The numeral 1 indicates a portion of the frame-work of a photographic camera, such, for example, as is described and shown in my application for Letters Patent filed October 8, 1891, Serial No. 408,141. The frame 1 is provided with an attached overhanging metallic flange 2, which extends round three sides of the frame in such manner that the plate-holder can be introduced under such flange for the purpose of securing it in proper position to expose a picture.

The improved plate-holder is composed of a metallic plate 3, having its lower edge secured to a wooden or other rib 4 and its remaining edges bent laterally, as at 5, and then extended into a projecting rim 6, which extends round three sides of the metallic plate. The rim 6 is formed into a flange 7, which also extends round three sides of the plate, as in Fig. 3, to constitute a space for three edges of the imperforate slide or cover 8, so that this slide or cover can be moved into and out of position beneath the flange 7.

The lateral bends 5 round the three edge portions of the metallic plate 3 constitute a chamber or compartment 9 for receiving the plate or film 10. The lateral bend 5 at the upper portion of the plate-holder is provided with a spring-lip or similar projection 12 for the purpose of retaining the plate or film from contact with the slide or cover 8 at this end of the plate-holder, and the wooden or similar rib 4 is provided with a strip 13 of cloth or other suitable material, against which the slide or cover 8 rests, for the purpose of effectually excluding light.

An elastic spring 14, composed, preferably, of a strip of elastic material, such as rubber, is arranged upon the upper edge of the rib 4, and the flexible or textile strip 13 extends at one side of this spring. The object of the spring is to constitute an elastic rest for the lower edge of the plate or film, so that the latter is held firmly in position within the chamber 9, and is thereby prevented from moving about therein.

The frame 1 is preferably provided at the lower edge with a strip 15 of textile or other suitable material, against which the slide or cover rests, to exclude light at this point.

To introduce a plate or film into the plate-holder, the slide or cover is withdrawn and the upper edge of the plate or film is inserted beneath the lip or projection 12, and then the plate or film is pressed into the chamber 9, so that the lower edge of the plate slightly compresses the spring 14 for the purpose of firmly holding the plate in a fixed position. The slide or cover is then moved inward to close the plate-holder, and the latter is inserted beneath the overhanging flange 2 of the camera-frame 1, so that the plate-holder is held in proper position for an exposure when the slide or cover 8 is withdrawn.

The metallic plate 3, which constitutes the main frame of the plate-holder, is corrugated, as at 16, to render it more elastic, and by this means the plate or film can be dislodged by pressing upon the central portion of the metallic plate 3, thereby materially facilitating the removal of the plate or film from the plate-holder.

The outer edge of the slide or cover 8 is formed or otherwise provided with a ridge or ledge 17 to facilitate its withdrawal from the plate-holder.

The construction described and shown provides a plate-holder which is simple in construction and can be economically manufactured, while fulfilling all the conditions required to exclude light and retain the plate or film in a firm position, so that it is held from contact with the slide or cover.

Having thus described my invention, what I claim is—

The combination, with a frame 1, having an overhanging flange 2 round three of its sides, of a plate-holder composed of a plate 3, having the lateral bend 5, outwardly-extending ledge 6, and inwardly-extending flange 7 round three of its edge portions, the rib 4 on the plate, provided with a light-excluding packing-strip 13, a spring 14, arranged on the rib, and a slide 8, movable beneath the inwardly-extending flange and bearing against the packing-strip, substantially as described.

In testimony whereof I have hereunto set my hand in the presence of two subscribing witnesses.

FERDINAND SERVUS.

Witnesses:
W. H. EDWARDS,
W. HAUPT.